United States Patent Office 3,425,961
Patented Feb. 4, 1969

3,425,961
PROCESS FOR PREPARING SYNTHETIC RESINS FROM POLYGLYCIDYL ETHERS OF CYCLOALIPHATIC POLYHYDROXYL COMPOUNDS WITH HARDENING AGENTS
Karl Jellinek, Duisburg-Meiderich, and Udo Post, Angermund, Germany, assignors to Rutgerswerke und Teerverwertung Aktiengesellschaft, Frankfurt am Main, Germany
No Drawing. Filed July 6, 1966, Ser. No. 563,043
Claims priority, application Germany, July 10, 1965,
R 41,062, R 41,063
U.S. Cl. 260—2        10 Claims
Int. Cl. C08g 30/14, 30/12, 30/02

ABSTRACT OF THE DISCLOSURE

Synthetic resin masses which are resistant to creeping current and to arc, are prepared from cycloaliphatic epoxide compounds by reacting diglycidyl ethers of cycloaliphatic dihydroxyl compounds or triglycidyl ethers of cycloaliphatic trihydroxyl compounds, or polyglycidyl ethers of cycloaliphatic polyhydroxyl compounds with hardening agents or catalytic hardening agents. Such hardening or curing agents may be e.g. polyamines, polyaminoamides, polycarboxylic acid anhydrides, tertiary amines or Lewis acids.

---

In the production of electric apparatus and devices for low voltage engineering and particularly for high voltage engineering, plastics which are resistant to creeping currents and to arcs are preferably used as parts of insulators. However, the number of such resistant materials is considerably limited, particularly as far as the duro plastic materials are concerned, which are preferred in electrical engineering, due to their thermal stability and dimensional stability at elevated temperatures.

Thus, it has been suggested, for example, to use melamine-resin-impregnated laminated paper, laminated fabrics, moldable masses, and plastics reinforced by glass fibers as materials resistant to creeping currents and arcs, in high voltage articles, e.g. contact rods, blasthead parts of circuit breakers, contact levers etc. It has been found, however, that in curing these materials volatile products, such as water and formaldehyde are split off, so that the production of articles from these materials is possible only in high pressure autoclaves or in hot presses and the inclusion of decomposition products results in a deterioration of the important dielectric characteristics.

It has been also known to cure aromatic di- or polyglycidyl-ether by means of polyfunctional curing agents, such as, for example, polyamines, polycarboxylic acid anhydrides, or with catalytically acting substances, such as tertiary amines or Lewis-acids, without splitting off volatile substances and without the application of excess pressure, to form solid molded materials which can be preferably applied to the production of parts of electric apparatus. However, the resistance to creeping currents and arcs of such molded materials is not satisfactory. Essentially better results are obtainable in this connection in the use of cycloaliphatic epoxide resins which have also been known previously. The starting products of these materials are derived from cyclo-olefines which have at least 2 double bonds per molecule, by causing them to react with peracetic acid. Particularly favorable results are obtainable herein in the use of compounds which contain two cyclopentane rings or cyclohexane rings connected with each other over short aliphatic chains, and tricyclic epoxide compounds, e.g. dicyclopentadiene dioxide. In conformity with the theory, it has been found that the cycloaliphatic dicarboxylic acid anhydrides are the best curing agents for cycloaliphatic epoxide compounds of this type, in the production of molded articles resistant to arc. However, these cast resins too show very considerable disadvantages:

(1) Due to the low reactivity of the epoxide groups which are directly at the ring, they cannot be cured at ordinary room temperature and are, therefore, eliminated from many uses in electrical engineering.

(2) The mechanical strength of the cured products is lower than that of conventional diglycidyl ethers.

(3) The elongation values are very low.

(4) The impact resistance at low temperature is unfavorable.

It has now been unexpectedly found that the above described disadvantages can be largely avoided if as epoxide compounds reaction products of such cycloaliphatic dihydroxy compounds with epichlorhydrine are used, which carry both hydroxyl groups directly at one, or several, cycloaliphatic nuclei.

As examples of suitable cycloaliphatic dihydroxyl compounds for the preparation of cycloaliphatic diglycidyl ethers according to the present invention, the following are mentioned: 1,2-, 1,3-, 1,4-dihydroxycyclohexane; 4,4′ - dihydroxydicyclohexylmethane; 4,4′-dihydroxydicyclohexyl-2,2′-propane; 1,3 - dihydroxycyclopentane; 4,4′-dihydroxydicyclohexyl; 2,2′ - dihydroxydiperhydronaphthylmethane; 3,3′-dihydroxydicyclopentylmethane.

The preferred curing, or hardening, agents for the preparation of molded materials which are resistant to creeping currents and arcs according to the invention, are polyfunctional compounds which are known per se and effect curing or hardening at ordinary room temperatures, or lower temperatures, such as, for example, triethylenetetramine; tetraethylenepentamine; dipropylene-triamine; diethylamino-propylamine; N-aminoethylpiperazine; 4,4′-diamino-dicyclohexylmethane; β,β′ - diaminodiethylether polyaminoamides. The known heat-hardening agents can also be used, such as polycarboxylic acid anhydrides, for example phthalic acid anhydride, hexahydrophthalic acid anhydride, tetrachlorophthalic acid anhydride, or preferably polyamine-hardeners, such as m-phenylenediamine, 4,4 - diaminodiphenylsulfone, 4,4′ - diaminodiphenylmethane. In the use of heat-hardening agents the curing or hardening velocity can be increased by the co-use of tertiary amines or amine salts as accelerators. A hardening process which is accelerated in this manner is frequently denoted thermal hardening ("Warmhartung") because at equal hardening time the hardening temperature can be reduced. It is also possible to release the hardening by the exclusive use of catalytically acting substances, e.g. tertiary amines or Lewis acids.

To the cycloaliphatic diglycidylethers according to the invention, as reactive diluents aliphatic or cycloaliphatic monoepoxide compounds can be added.

The combinations of hardening agents with epoxide compounds according to the present invention, which result in the formation of synthetic resins according to the invention, can be processed by casting—with or without fillers—to molded parts preferably for use in electrical engineering. However, they can be used also as binders in plastics reinforced by glass fibers, as coating compositions and raw materials for lacquers and also as adhesives for porous and above all for nonporous materials. Preferred uses are: high voltage electrical parts, such as terminal bushing insulators, suspension insulators blasthead parts of circuit breakers and sealing compounds for cable sleeves, and end boxes.

Example 1

116 parts by weight of 1,4-dihydroxycyclohexane obtained by hydrogenation of hydroquinone with hydrogen in the presence of Raney-nickel, are caused to react with 186 parts by weight of epichlorohydrin and 1.5 parts by weight of boron fluoride-etherate having a $BF_3$ content of 60% by weight. The resulting dichlorohydrinether is converted into the corresponding diglycidylether (I) with 80 parts by weight of NaOH diluted with water to a 10% solution.

229 parts by weight of the diglycidylether (I) are mixed at room temperature with 42 parts by weight of diethylenetriamine and cast into standard test bar molds. After 24 hours the mass is solidified to a solid, infusible molded product. In order to attain highest strength, the bars are subsequently tempered at 100° C. for two hours. Examination of the bars thus prepared yielded the following characteristics:

Flexural strength according to DIN 53452
  kp./cm.$^2$__ 1250
Impact strength according to DIN 53453
  cm. kp./cm.$^2$__ 32
Dimensional stability under heat according to
  Martens (DIN 53458), ° C. _____ 82
Stability to creeping currents according to DIN
  53480 _____ T5
Arc resistance according to DIN 53484 _____ L4
Volume resistance according to DIN 53482
  $\Omega$/cm__ $3.1 \times 10^{16}$ Example 2

240 parts by weight of 4,4'-dihydroxydicyclohexyl-2,2-propane prepared from bisphenol A by treatment with hydrogen under pressure in the presence of Raney-nickel, are caused to react with 186 parts by weight of epichlorohydrin and 1.5 parts by weight of $BF_3$-ether solution containing 60% by weight of $BF_3$. From the resulting dichlorohydrin-ether the diglycidyl-ether II is prepared by treatment with 80 parts by weight of NaOH in aqueous solution of 10% NaOH.

353 parts by weight of diglycidylether II are mixed with 240 parts by weight of hexahydrophthalic acid anhydride and 4 parts by weight of benzyldimethylamine. A liquid casting resin results, from which standard test bars are cast which are hardened as follows:

3 hours at 100° C.,
15 hours at 120° C., and
6 hours at 150° C.

Examination of the standard bars thus prepared has shown the following characteristics:

Flexural strength according to DIN 53452
  kp./cm.$^2$__ 1150
Impact strength according to DIN 53453
  cm. kp./cm.$^2$__ 25
Tensile strength according to DIN 53455
  kp./cm.$^2$__ 650
Dimensional stability under heat according to
  Martens (DIN 53458), ° C. _____ 85
Stability to creeping currents according to DIN
  53480 _____ T5
Arc resistance according to DIN 53484 _____ L4
Volume resistance according to DIN 53482
  $\Omega$/cm__ $3.1 \times 10^{16}$ Example 3

353 parts by weight of diglycidylether II prepared in the manner described in the above Example 2, are mixed with 280 parts by weight of methylendomethylenetetrahydrophthalic acid anhydride and 6 parts by weight of tris (dimethylaminomethyl)-phenol and subjected to hardening by heating at 120° C. for 15 hours and at 150° C. for 6 hours. The physical characteristics of the material thus obtained were as follows:

Flexural strength according to DIN 53452
  kp./cm.$^2$__ 1230
Impact strength according to DIN 53453
  cm. kp./cm.$^2$__ 18
Tensile strength according to DIN 53455
  kp./cm.$^2$__ 570
Dimensional stability under heat according to
  Martens (DIN 53458), ° C. _____ 97
Stability to creeping currents according to DIN
  53480 _____ T5
Arc resistance according to DIN 53484 _____ L4
Volume resistance according to DIN 53482
  $\Omega$/cm__ $2.8 \times 10^{16}$ Example 4

240 parts by weight of the diglycidylether II prepared in the above Example 2, are intimately mixed with 24 parts by weight of triethylenetetramine at room temperature and allowed to stand over night until the reaction of polyaddition is terminated. In order to complete the reaction, the mass is subsequently tempered for 3 hours at 100° C. The physical properties of the resulting material are as follows:

Flexural strength according to DIN 53452
  kp./cm.$^2$__ 1150
Impact strength according to DIN 53453
  cm. kp./cm.$^2$__ 15
Dimensional stability under heat according to
  Martens (DIN 53458), ° C. _____ 70
Stability to creeping currents according to DIN
  53480 _____ T5
Arc resistance according to DIN 53484 _____ L4
Volume resistance according to DIN 53482
  $\Omega$/cm__ $2.9 \times 10^{16}$ Example 5

250 parts by weight of the diglycidylether II of medium viscosity prepared in the above Example 2 are mixed with 15 parts by weight of low viscosity butylglycidylether. The viscosity of the cycloaliphatic epoxide resin is thereby reduced to about 1000 centipoise at 25° C. Hardening is carried out with the addition of 27.5 parts by weight of triethylenetetramine at 25° C. The mass is cured after 24 hours. Subsequently the cured mass is tempered for 2 hours at 100° C. and has then the following physical characteristics:

Flexural strength according to DIN 53452
  kp./cm.$^2$__ 950
Impact strength according to DIN 53453
  cm. kp./cm.$^2$__ 12
Dimensional stability under heat according to
  Martens according to DIN 53458, ° C. _____ 55
Stability to creeping currents according to DIN
  53480 _____ T5
Arc resistance according to DIN 53484 _____ L4
Volume resistance according to DIN 53482
  $\Omega$/cm__ $3.5 \times 10^{16}$ It has been further found that according to a modification of the invention, the dimensional stability under heat of synthetic plastics prepared according to the invention described above can be further increased by using glycidylethers of cycloaliphatic hydroxyl compounds which contain at least 3 hydroxyl groups directly at one or several cycloaliphatic nuclei.

As examples of starting materials for the preparation of tri- or polyglycidylethers according to the invention, the following are mentioned: 2,6-bis (4'-hydroxycyclohexylmethyl)-1 - hydroxycyclohexane; 1,3,5 - trihydroxycyclohexane (phloroglucit); 1,2,2-tris (4'-hydroxycyclohexyl) ethane; 2,4,2',4'-tetrahydroxydicyclohexyl - methane; fully hydrogenated phenol-formaldehyde condensation products of the novolak type having 3 to 10 cyclohexane rings. Preparation of the polyglycidyl ethers from the polyhydroxyl compounds according to this embodiment of the invention takes place according to a two-step process known per se, in the first step of which the corresponding polychlorohydrinethers are formed by reaction with epichlorohydrin and Lewis acids, and said ethers are converted by subsequent reaction with alkaline substances, e.g. alkali hydroxides the polyglycidyl ethers are formed.

For preparing the moldable materials resistant to creeping currents and arcs also in this modification the known polyfunctional compounds which effect hardening at ordinary room temperatures and lower temperatures, are preferably used. As examples of said compounds triethylenetetramine, tetraethylenepentamine, dipropylenetriamine, diethylaminopropylamine, N-aminoethylpiperazine, 4,4′-diaminodicylohexylmethane, $\beta,\beta'$-diaminodiethylether are mentioned. The known heat-hardening agents, such as polycarboxylic acid anhydrides, such as phthalic acid anhydride, hexahydrophthalic acid anhydride, tetrachlorophthalic acid anhydride can be used, or preferably aromatic polyamine hardening agents, e.g., m-phenylenediamine, 4,4′ - diaminodiphenylsulfone, 4,4′ - diaminodiphenylmethane. The velocity of hardening with heat-hardening agents can be increased by co-use of tertiary amines or amine salts as accelerators. A hardening procedure accelerated in this manner is frequently denoted as thermo-hardening ("Warmhartung") because at equal hardening period the hardening temperature can be reduced. Hardening can be also released by the exclusive use of catalytically acting substances such as, for example, tertiary amines or Lewis acids.

The mixing ratio between the cycloaliphatic polyglycidylethers and the hardening agents can be varied within wide limits, although preferably stoichiometric amounts are caused to react with each other. The catalytically acting hardening agents are used in amounts of 0.8 to 20 parts by weight based on 100 parts by weight of diglycidylether.

To the cycloaliphatic tri- and polyglycidyl-ethers, aliphatic or cycloaliphatic mono- and diepoxide compounds can be added as reactive diluents.

The mixtures of epoxide compounds according to this modification of the invention with hardening agents can be processed substantially in the same manner and substantially for the same uses as described above in connection with reaction products of epichlorohydrin with cycloaliphatic dihydroxyl compounds having both hydroxyl groups directly at one or several cycloaliphatic nuclei.

Example 6

324 parts by weight of 1,2,2-tris (4′-hydroxcyclohexyl) ethane are caused to react with 279 parts by weight of epichlorohydrin and 1.5 parts by weight of BF$_3$-etherate-solution containing 60% by weight BF$_3$ to form the trichlorohydrinether. Conversion into the triglycidyl ether (I′) is carried out by treatment with 120 parts by weight NaOH in 10% aqueous solution.

500 parts by weight of the triglycidylether I′ are mixed with 62 parts by weight of diethylenetriamine and cast into standard test bar molds. After hardening for 24 hours at ordinary room temperature, the standard test bars are removed from the molds and subsequently tempered at 120° C. for 2 hours. The physical characteristics of the resulting bars are as follows:

Flexural strength according to
   DIN 53452 _____kp./cm.$^2$__ 1050
Tensile strength according to
   DIN 53455 _____kp./cm.$^2$__ 470
Impact strength according to
   DIN 53453 _____cm. kp./cm.$^2$__ 17
Dimensional stability under heat according to
   Martens, according to DIN 53458, ° C. _____ 110
Volume resistance according to
   DIN 53482 _____Ω/cm__ 2.7×10$^{16}$
Stability to creeping currents according to
   DIN 53480 _____ T5
Arc resistance according to DIN 53484 _____ L4

Example 7

94 parts by weight of phenol (carbolic acid) and 75 parts by weight of formaldehyde solution containing 30% by weight of formaldehyde and 1 part by weight of hydrochloric acid (of 37%) are condensed to a novolak having an average molecular weight of 400 (corresponding to about 4 phenolic OH-groups per molecule). By the action of hydrogen under pressure, in the presence of Raney-nickel, the novolak is completely hydrogenated to a product II′ which contains in the average 4 hydroxycyclohexyl rings linked by methyl-bridges.

400 parts by weight of product II′ are caused to react with 380 parts by weight of epichlorohydrin and 1.5 parts by weight of BF$_3$-etherate solution containing 60% by weight of BF$_3$ to form tetrachlorohydrinether. Conversion into tetraglycidylether III is effected with 160 parts by weight of NaOH in 10% aqueous solution.

63 parts by weight of tetraglycidylether III were mixed with 55 parts by weight of tetrahydrophthalic acid anhydride and 1 part by weight of benzyldimethylamine. Hardening was carried out for 3 hours at 100° C.,
15 hours at 120° C., and
6 hours at 150° C.

The resulting material had the following chractaristics:

Flexural strength according to
   DIN 53452 _____kp./cm.$^2$__ 1,150
Tensile strength according to
   DIN 53455 _____kp./cm.$^2$__ 490
Impact strength according to
   DIN 53453 _____cm. kp./cm.$^2$__ 16
Dimensional stability under heat according to
   Martens (DIN 53458), ° C. _____ 152
Volume resistance according to
   DIN 53482 _____Ω/cm__ 3.1×10$^{16}$
Stability to creeping currents according to
   DIN 53480 _____ T5
Arc resistance according to DIN 53484 _____ L4

Example 8

340 parts by weight of tetraglycidylether III prepared in the manner described in the above Example 7, were mixed with 70 parts by weight of 1-epoxyethyl-3,4-epoxycyclohexane whereby a viscosity at room temperature of about 12,000 centipoises—which is suitable for processing—was attained. After the addition of 58 parts by weight of triethylenetetramine, the mass was cast into standard test bar molds. The mass was hardened at ordinary room temperature and subsequently hardened at 110° C. for 3 hours. The resulting product had the following characteristics:

Flexural strength according to
   DIN 53452 _____kp./cm.$^2$__ 1450
Impact strength according to
   DIN 53453 _____cm. kp./cm.$^2$__ 14
Dimensional stability under heat according to
   Martens: (DIN 53458), ° C. _____ 90
Volume resistance according to
   DIN 53482 _____Ω/cm__ 2.7×10$^{16}$
Stability to creeping currents according to
   DIN 53480 _____ T5
Arc resistance according to DIN 53484 _____ L4

As examples of aliphatic and/or cycloaliphatic mono-epoxide compounds which can be added as reactive diluents to the glycidyl ethers, the following are mentioned: butylglycidylether, 3,4,3′,4′ - diephoxydicyclohexylether, 1-epoxyethyl-3,4-epoxycyclohexane.

In the above examples, the abbreviation "kp." stands for "kilopond," the unit of force. Hydrogenation with hydrogen is carried out preferably under atmospheric pressure or under an excess pressure up to 50 atmospheres above ordinary atmospheric pressure. In the process of claim 2 hardening is preferably carried out in the range of 25 to 200° C., and in the process of claim 3 hardening is carried out preferably in the range of 80 to 200° C.

The parts and percent mentioned herein are by weight if not otherwise stated. The abbreviation DIN stands for "Deutsche Industrienormen."

What is claimed is:

1. Process for preparing synthetic resin masses which are resistant to creeping currents and resistant to arc, from cycloaliphatic epoxide compounds, in which hardening agents selected from the group consisting of polyfunctional hardening agents for glycidylether compounds and catalytically acting hardening agents for glycidylether compounds are used, said polyfunctional hardening agents being selected from the group consisting of diethylenetriamine, triethylenetetramine, tetraethylenepentamine, dipropylenetriamine, diethylamino-propylamine, N-aminomethylpiperazine, 4,4' - diamino - dicyclohexylmethane, β,β'-diamino-diethylether, polycarboxylic acid anhydrides, m-phenylenediamine, 4,4' - diaminodiphenylsulfone, and 4,4'-diaminodiphenyl-methane, and said catalytically acting hardening agents being selected from the group consisting of tertiary amines and Lewis acids, are reacted with glycidyl ethers selected from the group consisting of (a) diglycidylethers of cycloaliphatic dihydroxyl compounds; (b) triglycidylethers of cycloaliphatic trihydroxyl compounds; and (c) polyglycidylethers containing more than 3 glycidyl radicals, of cycloaliphatic polyhydroxyl compounds, said glycidylethers (a), (b), (c) carrying the hydroxyl groups directly at cycloaliphatic nuclei, said catalytically acting hardening agents being used in amounts of 0.8 to 20 parts by weight, for 100 parts by weight of the glycidyl ethers.

2. A process as claimed in claim 1 in which the polyfunctional hardening agents are selected from the group consisting of polyamines, polyaminoamides and polycarboxylic acid anhydrides.

3. A process as claimed in claim 1, in which the hardening reaction is carried out with aliphatic polyamines at ordinary room temperature.

4. A process as claimed in claim 1, in which the hardening reaction is carried out at a temperature above 60° C. with a hardening agent selected from the group consisting of aromatic polyamines and tertiary aminocompounds.

5. A process as claimed in claim 1, in which diglycidylethers of hydrogenated diphenols are used in diglycidylether.

6. A process as claimed in claim 1, in which to the glycidylethers an epoxide compound selected from the group consisting of butylglycidyl ether, 3,4,3',4' - diepoxydicyclohexylether and 1-epoxyethyl-3,4-epoxycyclohexane is added as reactive diluent.

7. A process as claimed in claim 1, in which triglycidylethers of hydrogenated triphenols are used as triglycidylether.

8. A process as claimed in claim 1, in which polyglycidylethers of hydrogenated polyphenols are used as polyglycidylethers.

9. A process as claimed in claim 1, in which to the glycidylethers aliphatic diepoxide compounds of low viscosity are added as reactive diluents.

10. A process as claimed in claim 1, in which to the glycidylethers cycloaliphatic diepoxide compounds of low viscosity are added as reactive diluents.

No references cited.

WILLIAM H. SHORT, *Primary Examiner.*

T. PERILLA, *Assistant Examiner.*

U.S. Cl. X.R.

260—78.4